(12) United States Patent
Bellato et al.

(10) Patent No.: US 11,535,109 B2
(45) Date of Patent: Dec. 27, 2022

(54) THROTTLE VALVE FOR ADJUSTING THE FEEDING OF A GAS TO A FUEL CELL AND ELECTRIC DRIVE VEHICLE INCLUDING THE THROTTLE VALVE

(71) Applicant: MARELLI EUROPE S.p.A., Corbetta (IT)

(72) Inventors: Nazario Bellato, Bologna (IT); Michele Garofalo, Campobasso (IT); Domenico Samengo, Rome (IT); Cristian-Florin Ogrezeanu, Cerasu (RO); Stefano Musolesi, San Giovanni In Persiceto (IT)

(73) Assignee: MARELLI EUROPE S.p.A., Corbetta (IT)

( * ) Notice: Subject to any disclaimer, the term of this patent is extended or adjusted under 35 U.S.C. 154(b) by 260 days.

(21) Appl. No.: 17/060,233

(22) Filed: Oct. 1, 2020

(65) Prior Publication Data
US 2021/0101491 A1   Apr. 8, 2021

(30) Foreign Application Priority Data

Oct. 3, 2019  (IT) .......................... 102019000017894

(51) Int. Cl.
| | |
|---|---|
| *B60L 50/72* | (2019.01) |
| *B60K 1/04* | (2019.01) |
| *B60K 15/03* | (2006.01) |
| *F17C 1/00* | (2006.01) |
| *H01M 8/04089* | (2016.01) |

(52) U.S. Cl.
CPC ................ *B60L 50/72* (2019.02); *B60K 1/04* (2013.01); *B60K 15/03006* (2013.01);
(Continued)

(58) Field of Classification Search
CPC ..... B60L 50/72; B60K 1/04; B60K 15/03006; B60K 2015/03026; B60K 2015/03315;
(Continued)

(56) References Cited

U.S. PATENT DOCUMENTS

| | | | |
|---|---|---|---|
| 4,892,071 A * | 1/1990 | Asayama | B60K 26/04 137/614.16 |
| 5,002,032 A * | 3/1991 | Kolberg | F02D 11/107 123/399 |

(Continued)

FOREIGN PATENT DOCUMENTS

EP   3203055 A1   8/2017

OTHER PUBLICATIONS

Search Report for Italian Application No. 201900017894 dated May 28, 2020.

*Primary Examiner* — Jacob B Meyer
(74) *Attorney, Agent, or Firm* — Howard & Howard Attorneys PLLC

(57) ABSTRACT

A throttle valve for adjusting the feeding of a gas to a fuel cell, which includes: a valve body, divided into a first and a second portion; a gas feeding duct obtained in the first portion; a throttle plate arranged in the feeding duct; a shaft which is rotatably mounted in the first portion and supports the throttle plate; and an actuator which is mounted in the second portion and is configured to rotate the shaft. The throttle valve further comprises a magnetic joint, which transmits the motion from the actuator to the shaft and is divided into a first half coupled to the shaft, and a second half facing the first half and coupled to the actuator. The throttle valve also includes an insulating wall which insulates the first partition, in a pneumatically sealed manner, from the second portion of the valve body and is arranged between the two halves of the magnetic joint.

9 Claims, 6 Drawing Sheets

(52) U.S. Cl.
CPC ............ *F17C 1/00* (2013.01); *H01M 8/04089* (2013.01); *B60K 2015/03026* (2013.01); *B60K 2015/03315* (2013.01); *F17C 2221/012* (2013.01); *F17C 2270/0184* (2013.01); *H01M 2250/20* (2013.01)

(58) Field of Classification Search
CPC .................. F17C 1/00; F17C 2221/012; F17C 2270/0184; H01M 8/04089; H01M 2250/20
See application file for complete search history.

(56) References Cited

U.S. PATENT DOCUMENTS

| | | | | |
|---|---|---|---|---|
| 5,431,141 A * | 7/1995 | Kanazawa | ............. | B60K 26/04 |
| | | | | 123/399 |
| 5,979,405 A * | 11/1999 | Sato | ........................ | F02D 11/10 |
| | | | | 123/399 |
| 6,109,240 A * | 8/2000 | Sato | ........................ | F02D 11/10 |
| | | | | 606/130 |
| 6,236,199 B1 * | 5/2001 | Irle | ...................... | G01D 5/2093 |
| | | | | 324/207.17 |
| 6,646,395 B2 * | 11/2003 | Reimann | ................ | F02D 9/1065 |
| | | | | 318/400.42 |
| 6,851,410 B2 * | 2/2005 | Kawai | ...................... | F16K 27/08 |
| | | | | 123/399 |
| 6,883,494 B2 * | 4/2005 | Kurita | ................... | F02D 9/1065 |
| | | | | 123/337 |
| 7,069,906 B2 * | 7/2006 | Josten | ................... | F02D 9/1065 |
| | | | | 123/399 |
| 7,096,851 B2 * | 8/2006 | Matsuda | ................. | F02D 11/10 |
| | | | | 123/399 |
| 9,467,027 B2 * | 10/2016 | Kremer | ................... | H02K 11/30 |
| 2018/0309143 A1 * | 10/2018 | Takeyama | ................ | F16K 47/14 |
| 2019/0277202 A1 * | 9/2019 | Guiduzzi | ................ | F02D 9/107 |
| 2021/0101491 A1 * | 4/2021 | Bellato | .................... | B60K 1/04 |

\* cited by examiner

THROTTLE VALVE FOR ADJUSTING THE FEEDING OF A GAS TO A FUEL CELL AND ELECTRIC DRIVE VEHICLE INCLUDING THE THROTTLE VALVE

CROSS-REFERENCE TO RELATED APPLICATIONS

This patent application claims priority from Italian patent application no. 102019000017894 filed on Oct. 3, 2019, the entire disclosure of which is incorporated herein by reference.

TECHNICAL FIELD

The present invention relates to a throttle valve for adjusting the feeding of a gas, in particular hydrogen ($H_2$), to a fuel cell and a corresponding electric drive vehicle including the throttle valve.

PRIOR ART

Fuel cells are devices provided with a pair of electrodes (called anode and cathode), an electrolyte and optionally a catalyst which convert the chemical energy of a fuel and an oxidizing agent into reaction products (in particular, chemical compounds and electrical energy) through a pair of oxidation-reduction (also called "redox") reactions, generated at respective electrodes of the pair of electrodes.

Examples of known fuel cells are hydrogen cells, wherein hydrogen ($H_2$) is used as fuel and oxygen ($O_2$) as oxidizing agent. The reaction products of the oxidation-reduction reactions at the anode and at the cathode of a hydrogen cell are water ($H_2O$) and electrical energy, the latter typically being adapted to feed an electrical load. In recent years, hydrogen cells have been used in different application fields such as, e.g., the automotive sector, in particular for feeding electric motors of electric drive vehicles. The use of hydrogen cells has the advantage of providing electrical energy reducing environmental pollution.

Given the flammability of hydrogen, it is needed to provide for safety and preventive measures in systems integrating hydrogen cells capable of guaranteeing the integrity of said system; in particular, it is needed to identify dangerous situations, e.g. to detect potential hydrogen leaks, and to provide for preventive as well as isolating measures when potential leaks are identified. Moreover, it is needed to provide for adequate ventilation measures suitable for preventing potential hydrogen leaks.

In other words, the aim is to provide for regulating means for the flow of hydrogen to be provided to a hydrogen cell in a system using the latter, such as an electric drive vehicle.

The patent application US2018309143A1 and the patent U.S. Pat. No. 5,431,141A describe a throttle valve for adjusting the flow of air through an intake duct of an internal combustion engine.

The patent application US2019277202A1 describes a system with a fuel cell provided with a throttle valve.

DESCRIPTION OF THE INVENTION

The object of the present invention is to provide a throttle valve for adjusting the feeding of a gas, in particular hydrogen, to a fuel cell and a corresponding electric drive vehicle including the throttle valve.

According to the present invention, a throttle valve for adjusting the feeding of a gas to a fuel cell and a corresponding electric drive vehicle including the throttle valve are provided, as claimed in the appended claims.

BRIEF DESCRIPTION OF THE DRAWINGS

The present invention will now be described with reference to the attached drawings, which illustrate a non-limiting embodiment thereof, wherein.

PREFERRED EMBODIMENTS OF THE INVENTION

Figure 1:
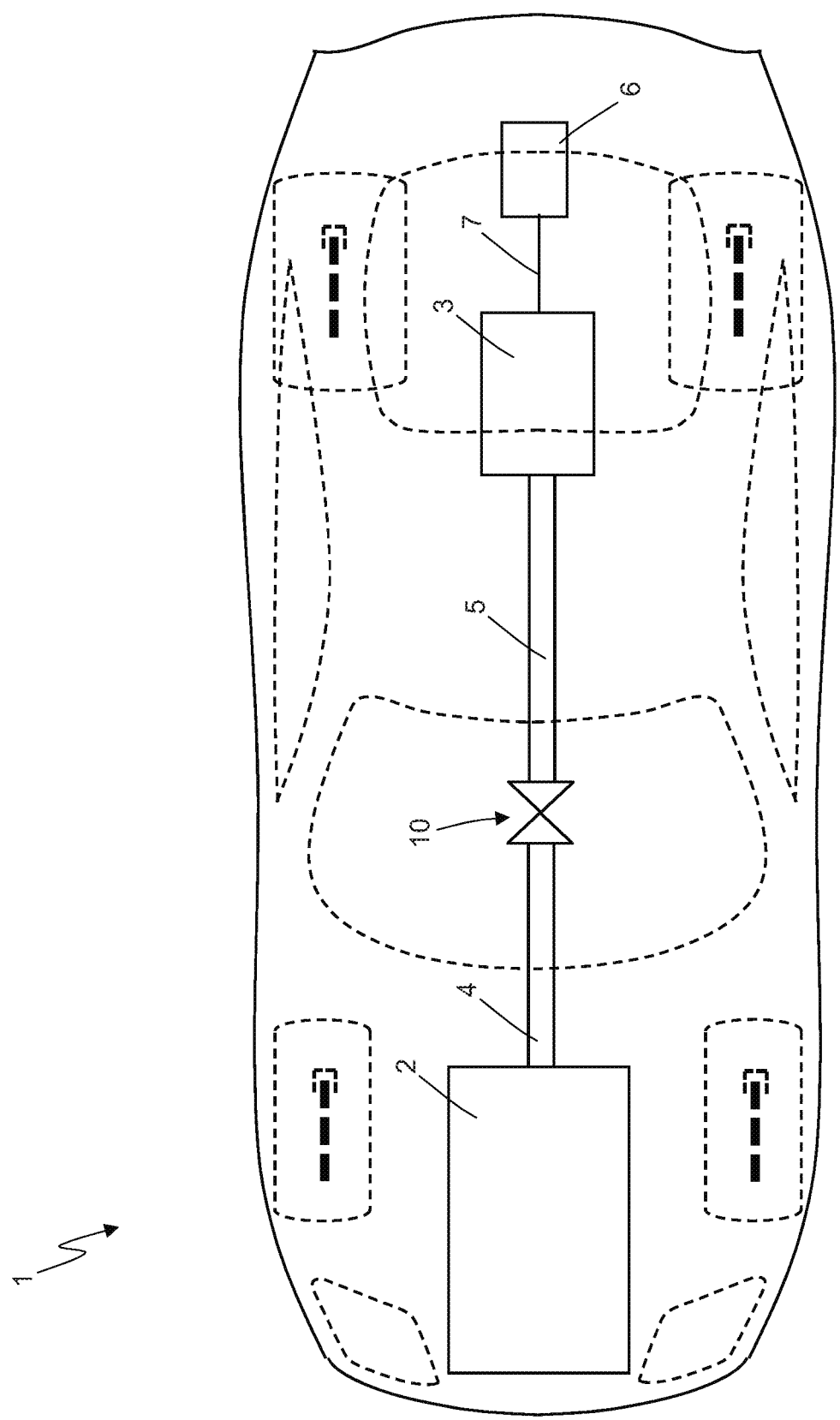
FIG. 1 is a schematic view of an electric drive vehicle integrating a throttle valve realized according to the present invention.

FIG. 1 schematically shows and as a whole an electric drive vehicle 1 comprising a throttle valve 10 realized according to an embodiment of the present invention and schematically illustrated in FIGS. 2-6.

As shown in FIG. 1, the throttle valve 10 is positioned between a reservoir 2, containing a gas, in particular hydrogen, and a fuel cell 3, in particular a hydrogen cell; the throttle valve 10 is connected to the reservoir 2 and to the fuel cell 3 via respective ducts 4 and 5, which are designed to transport the gas respectively from the reservoir 2 to the throttle valve 10 and from the throttle valve 10 to the fuel cell 3.

The electric drive vehicle 1 further comprises at least one electric motor 6, electrically connected to the fuel cell 3 via an electrical connection 7 and designed to generate a motor torque which is transmitted to drive wheels.

Figure 2:
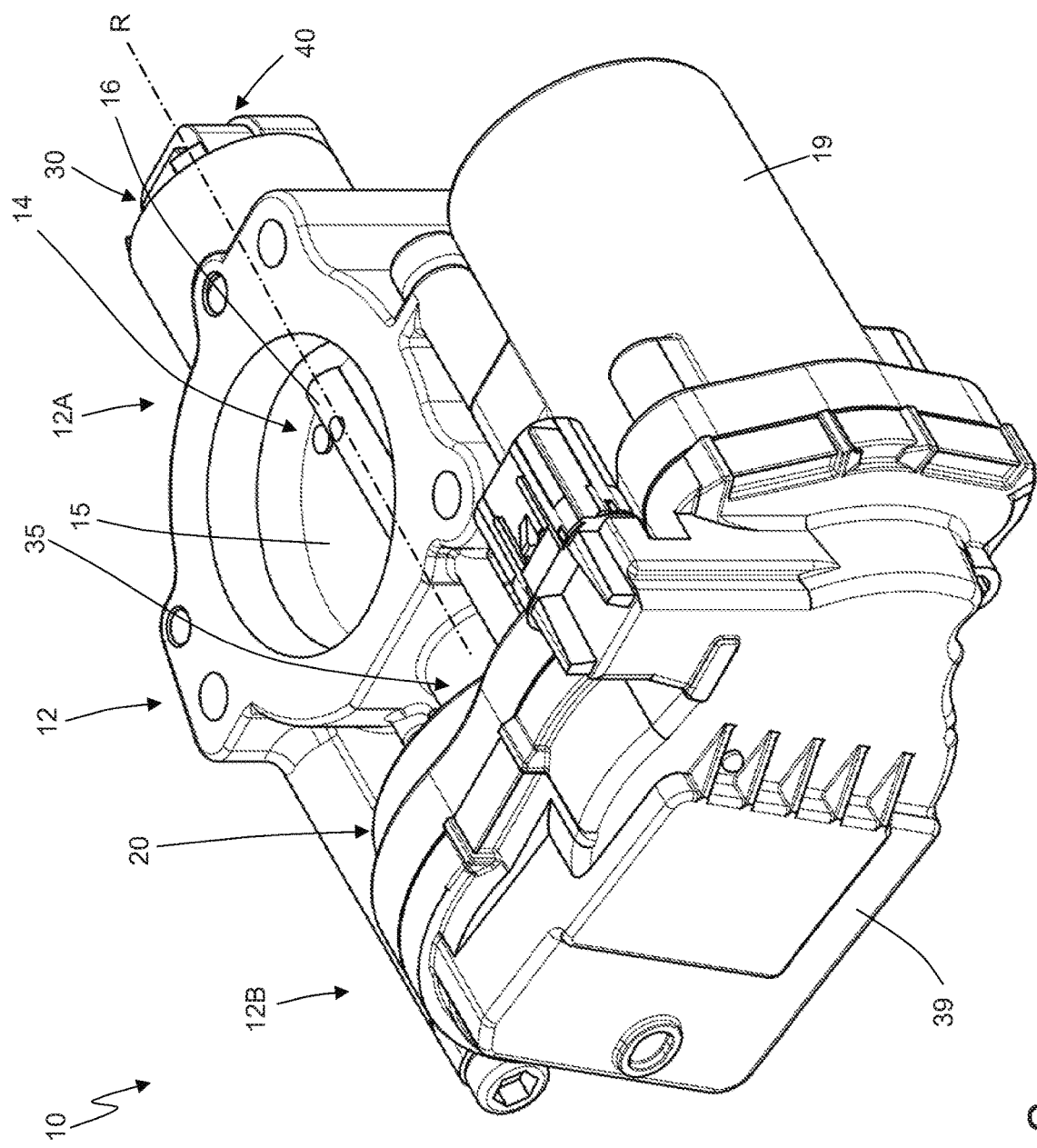
FIG. 2 is a perspective view of an embodiment of a throttle valve realized according to the present invention.
Figure 3:
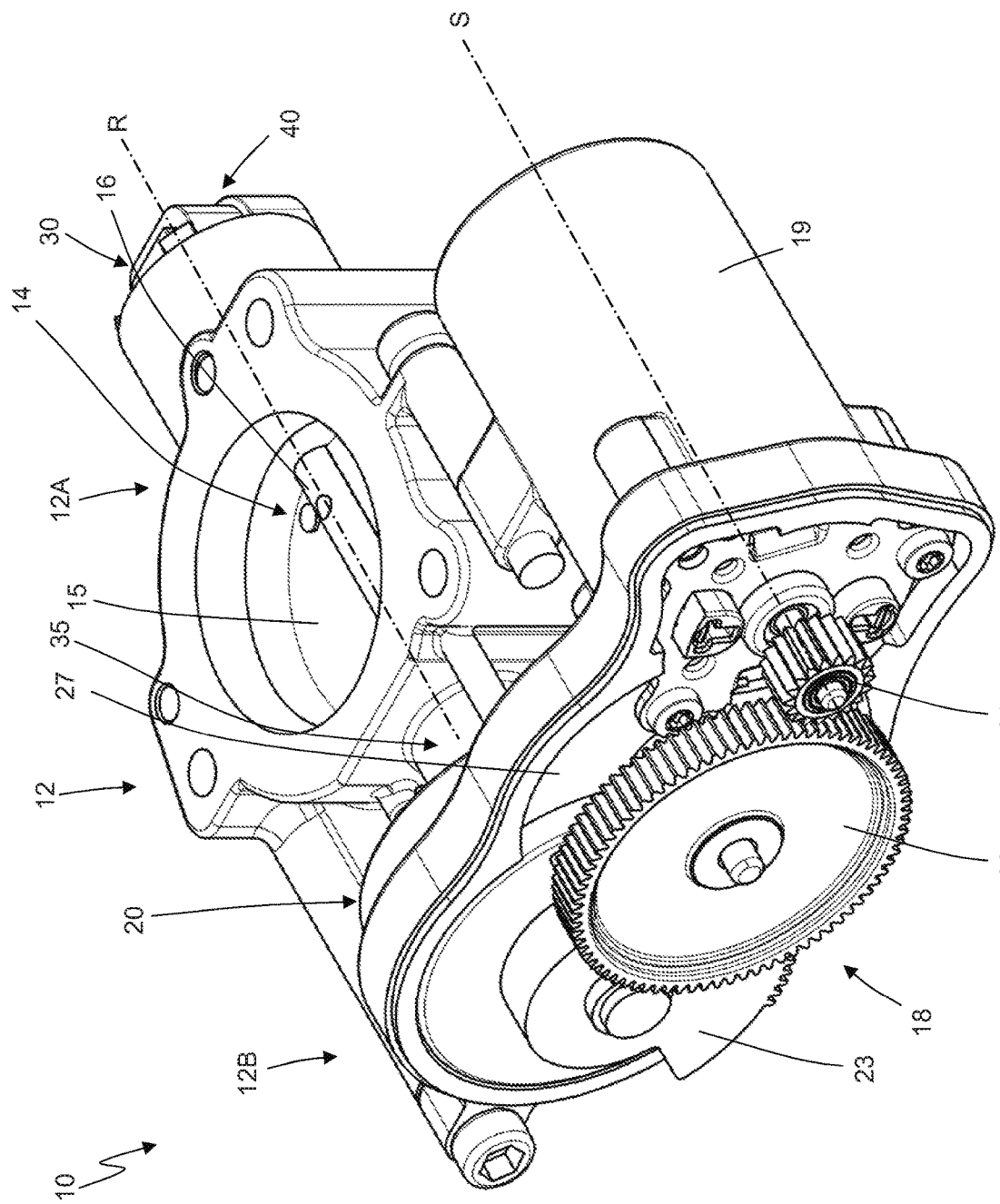
FIG. 3 is a perspective view of the throttle valve shown in FIG. 2 with parts removed for the sake of clarity.
Figure 4:
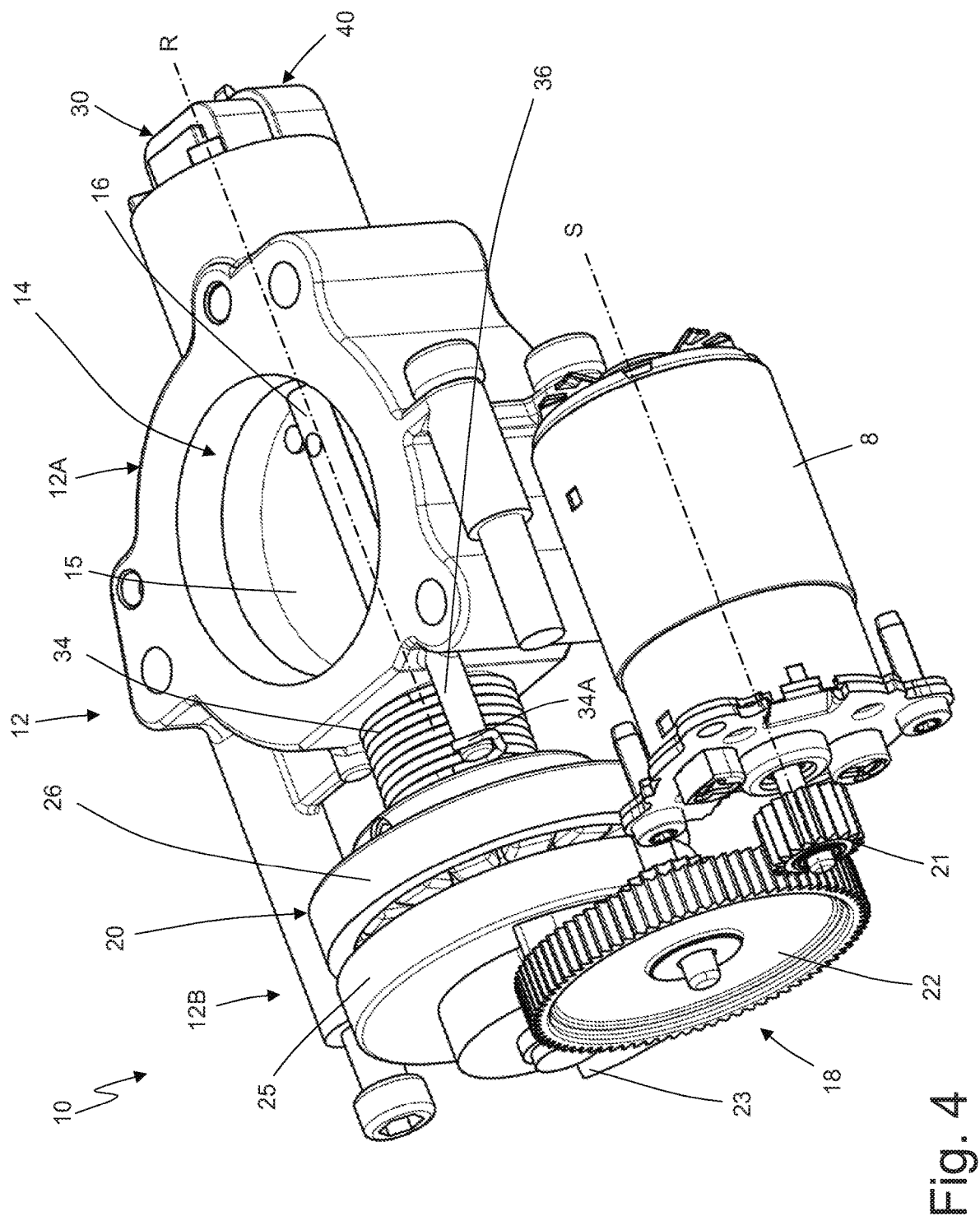
FIG. 4 is a different perspective view of the throttle valve shown in FIG. 2 with parts removed for the sake of clarity.

With reference to FIGS. 2-4, the throttle valve 10 comprises a metal valve body 12 having a portion 12A and a portion 12B, the latter being coupled to one another according to the modalities described in detail in the following. The valve body 12 comprises a feeding duct 14, in particular obtained in the portion 12A, through which the hydrogen drawn from the reservoir 2 via the duct 4 passes and continues towards the fuel cell 3 via the duct 5. The feeding duct 14 is engaged by a throttle plate 15, which moves between an opening position and a closing position of the feeding duct 14 through the action of an electric motor 8 (illustrated in FIG. 4). The throttle plate 15 is affixed onto a metal shaft 16 which is arranged in the portion 12A and is rotatably mounted around a longitudinal rotation axis R to rotate between the opening position and the closing position under the control of the electric motor 8.

The electric motor 8 is arranged in the portion 12B and is coupled to the shaft 16 through a gear transmission 18 (partially illustrated in FIGS. 3 and 4), which is also arranged in the portion 12B. The electric motor 8 is housed in a cylindrical chamber 19 which is arranged next to the feeding duct 14 and is obtained in the portion 12B. The gear transmission 18 comprises a gear 21 which is directly mounted on a shaft of the electric motor 8 and is designed to rotate around a corresponding rotation axis S, coinciding with the rotation axis of the shaft of the electric motor 8. The gear transmission 18 further comprises a gear 22 which comprises a first toothed ring, which meshes with the gear 21, and a second toothed ring (not shown) which is coaxial with the first toothed ring and has a smaller radius compared to the latter. Finally, the gear transmission 18 comprises a toothed sector 23, which meshes with the second toothed ring of the gear 22 and is coaxial with the shaft 16. According to a preferred embodiment, the gear 21 is normally made of sintered steel and the gear 22 is normally made of plastic material. According to a preferred embodiment, the gear transmission 18 is arranged in a chamber of the valve body 12 which is closed by a removable cover 39, shown in FIG. 2 and made, e.g., of plastic material.

Figure 5:
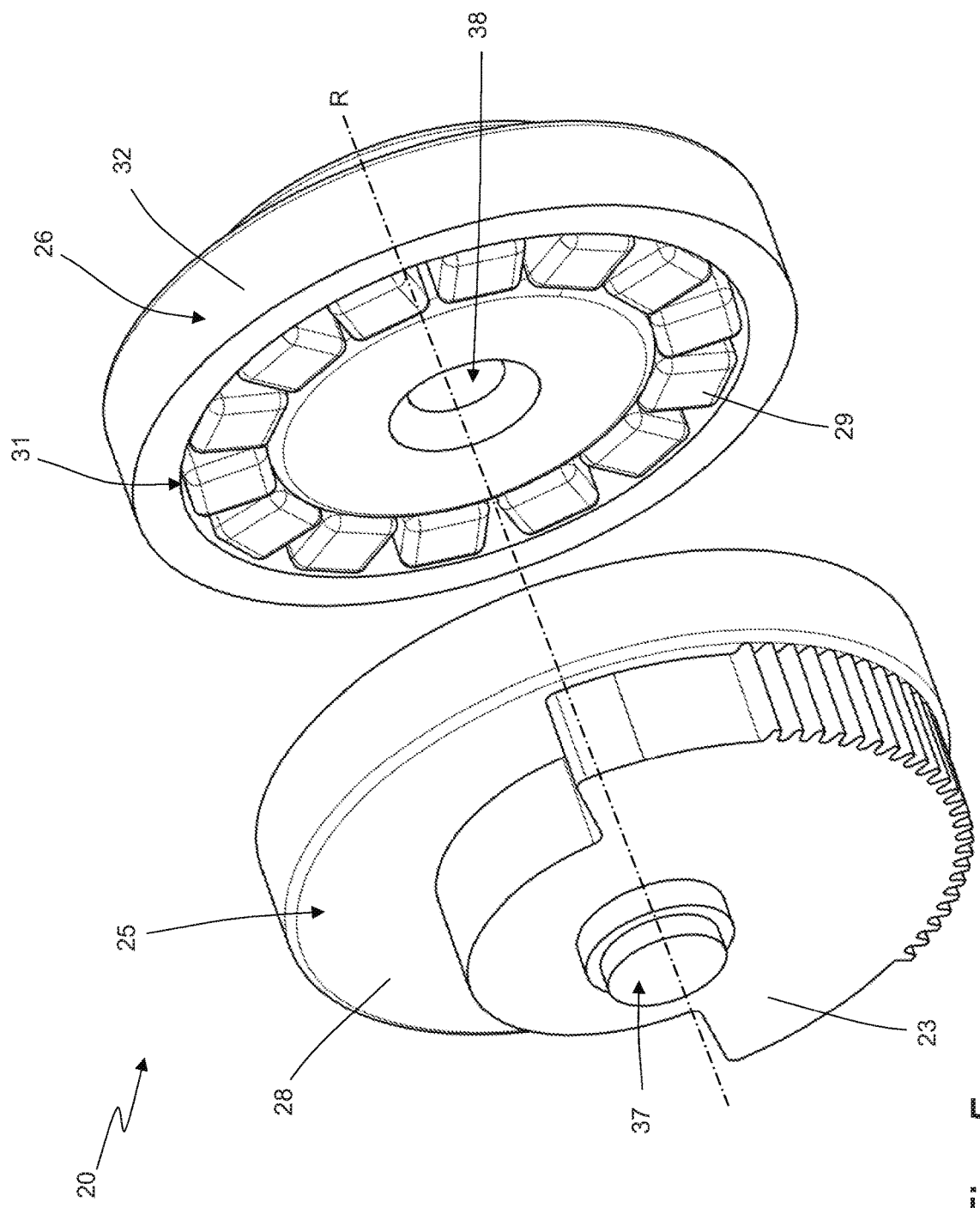
FIGS. 5 and 6 are two different perspective views of a magnetic joint of the throttle valve shown in FIG. 1.
Figure 6:
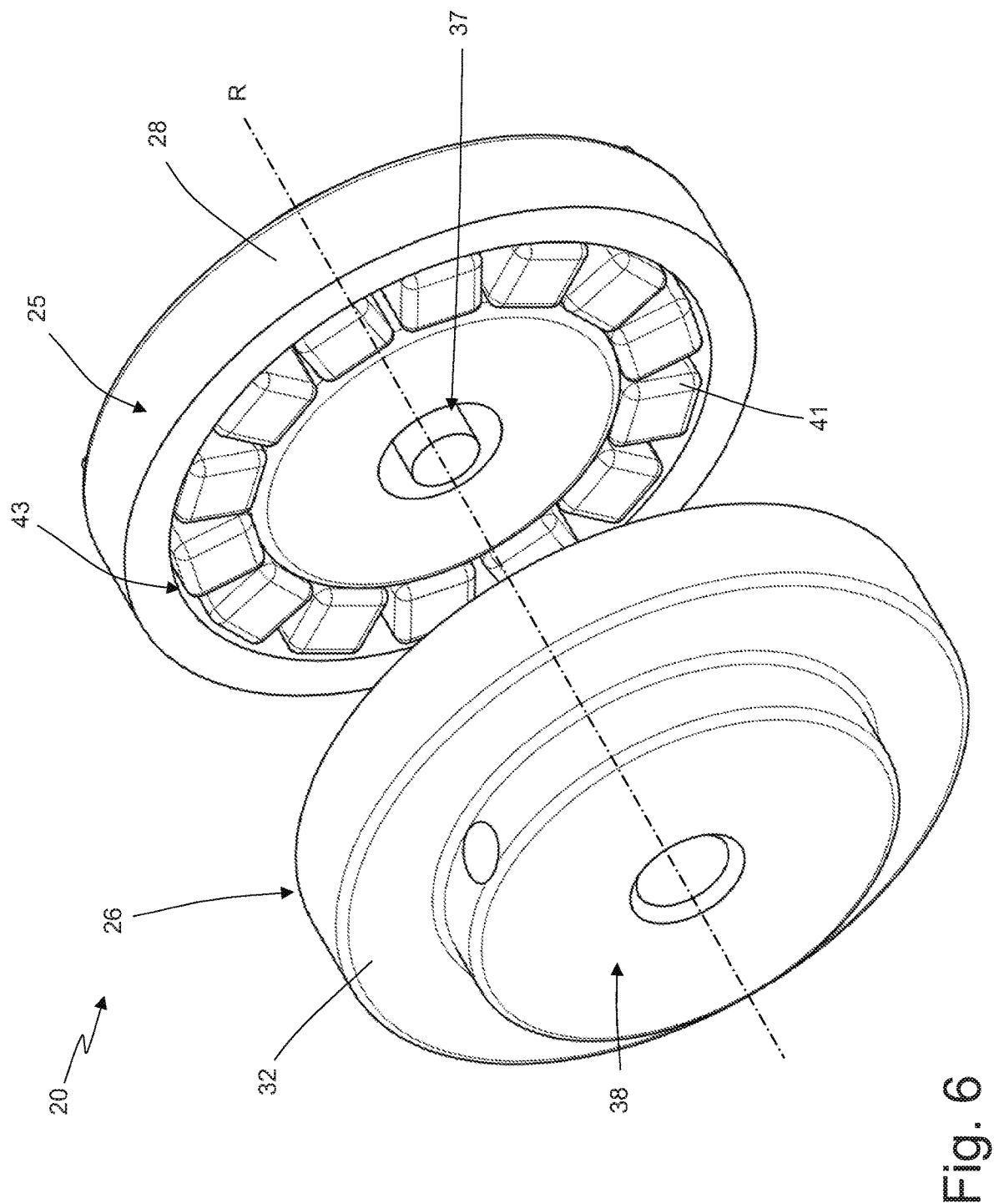

The throttle valve 10 further comprises a magnetic joint 20 which is positioned between the gear transmission 18 and the shaft 16 of the throttle valve 10; more precisely, the magnetic joint 20 is coaxial with the shaft 16 of the throttle valve 10, i.e. it is designed to rotate around the rotation axis R as a result of the movement induced by the electric motor 8 as well. With reference to FIGS. 4-6, the magnetic joint 20 comprises a joint half 25 and a joint half 26, respectively formed in the portions 12A and 12B of the valve body 12. The joint half 25 comprises a plurality of magnetic elements 41 (shown in FIG. 6) arranged in an annulus 43, the latter defined by a cover 28 and by a central portion 37 of the joint half 25; the joint half 26 comprises a plurality of magnetic elements 29 (shown in FIG. 5) arranged in an annulus 31, the latter defined by a cover 32 and by a central portion 38 of the joint half 26. The plurality of magnetic elements 41 of the joint half 25 and the plurality of magnetic elements 29 of the joint half 26 are magnetically coupled to one another, i.e. the plurality of magnetic elements 41 has an opposite polarity compared to the plurality of magnetic elements 29, so that the two joint halves 25 and 26 are magnetically attracted to one another.

In addition, according to the present embodiment, the toothed sector 23 is directly mounted on the joint half 25, so that the latter is mechanically coupled to the shaft of the electric motor 8 via the gear transmission 18.

Furthermore, between the two joint halves 25 and 26 an insulating wall 27 (shown in FIG. 3) is arranged, which is adapted to insulate the portion 12A from the portion 12B and thus the joint half 25 from the joint half 26 in a pneumatically sealed manner.

Again with reference to FIG. 4, the throttle valve 10 further comprises a return spring 34, arranged in the portion 12A and mechanically coupled to the joint half 26 or to the shaft 16; in particular, the return spring 34 is, e.g., a helical torsion spring (i.e. the spring loses its shape according to a circular motion, generating a counter-torque) and tends to rotate the shaft 16 in a closing direction with a movement that moves the throttle plate 15 towards the closing position. In detail, the return spring 34 is arranged around a cylindrical portion 35 (visible in FIGS. 2 and 3) of the portion 12A which is coaxial with the rotation axis R. One end 34A of the return spring 34 is connected to an anchoring portion 36, the latter formed in the portion 12A of the valve body 12; in addition, a further end (not shown) of the return spring 34 is connected to a further anchoring portion (not shown) obtained in the shaft 16 (or in the joint half 26) so that, in use, the rotation of the shaft 16 resulting from the movement induced by the electric motor 8 causes the generation of a counter-torque in the return spring 34 when such rotation is intended to move the plate 15 from the closing position to the opening position.

In use, when the electric motor 8 moves the gear transmission 18, the rotation of the toothed sector 23 causes a corresponding rotation of the joint half 25 around the rotation axis R; thanks to the magnetic coupling between the two joint halves 25 and 26, also the joint half 26 rotates around the rotation axis R in the same rotation direction of the joint half 25. As a consequence of the movement of the joint halves 25 and 26, the shaft 16 rotates around the rotation axis R, in particular in the same rotation direction of the two joint halves 25 and 26, so as to stop the throttle plate 15 towards the opening position.

According to a preferred embodiment, the throttle valve 10 comprises a position sensor 40 (schematically shown in FIGS. 2-4), e.g. of inductive type, arranged at an end 30 of the portion 12A of the body 12; in particular, the position sensor 40 is designed to detect the angular position of the shaft 16 and, thus, of the throttle plate 15 to allow a feedback control of the position of said throttle plate 15. For instance, the position sensor 40 could be of the type described in U.S. patent no. U.S. Pat. No. 6,236,199B1 and thus comprise a rotor angularly integral to the shaft 16 and a stator supported by the valve body 12 and arranged facing the rotor when in use. Alternatively, the position sensor 40 could be of a magnetostrictive type and thus comprise a permanent magnet integral to the shaft 16, in particular at the end 30.

According to an embodiment, the throttle valve 10 further comprises a gas sensor, in particular a hydrogen sensor (not shown), arranged on the valve body 12, coupled to the electric motor 8 and configured to detect potential gas leaks. In use, when a hydrogen leak is detected, the hydrogen sensor generates and transmits an electrical signal to the electric motor 8, which, based on such electrical signal, moves the throttle plate 15 towards the closing position almost immediately, interrupting the flow of gas through the feeding duct 14.

The aforementioned transition from the opening position to the closing position of the throttle plate 15 also occurs in absence of the action of the electric motor 8, i.e. the throttle plate 15 is generally in a closing position. In this way, the flow of gas, in particular of hydrogen, through the feeding duct 14 is permitted only when the electric motor 8 induces a movement of the gear transmission 18, of the magnetic joint 20 and, thus, of the shaft 16.

The throttle valve 10 described above has numerous advantages.

First of all, the presence of the insulating wall 27 allows insulating the two joint halves 25 and 26 and, consequently, the two portions 12A and 12B of the valve body 12, in a pneumatically sealed manner, making the passage of gas leaks from the portion 12A to the portion 12B totally impossible.

Moreover, the throttle valve 10 is designed to automatically close in the event of gas leaks; indeed, as stated above, the presence of the gas sensor makes it possible to detect gas leaks and, consequently, to control the electric motor 8 so as to move the throttle plate 15 in a closing position, thereby obstructing the feeding duct 14.

The obstruction of the feeding duct 14 also occurs in absence of the action of the electric motor 8, so as to avoid accidental gas leaks and, thus, to guarantee the safety of the electric drive vehicle 1 also when not in use.

In summary, the throttle valve 10 is an element which is completely sealed in the absence of actions by the electric motor 8 and which guarantees the safety of the electric drive vehicle 1 in any operating conditions.

Finally, the throttle valve 10 is simple and inexpensive to produce.

LIST OF THE REFERENCE NUMBERS OF THE FIGURES 1 electric drive vehicle
2 reservoir 3 fuel cell
4 duct
5 duct
6 electric motor
7 electrical connection
8 electric motor
10 throttle valve
12 valve body
12A portion
12B portion
14 feeding duct
15 plate
18 gear transmission
19 connector
20 magnetic joint
21 gear
22 gear
23 toothed sector
25 joint half
26 joint half
27 insulating wall
28 cover
29 magnetic elements
30 end
31 annulus
32 cover
33 borehole
34 return spring
34A end
35 cylindrical portion
36 anchoring portion
37 central portion
38 central portion
39 removable cover
40 position sensor
41 magnetic elements
42 annulus
R rotation axis
S rotation axis

The invention claimed is:

1. A throttle valve (10) for adjusting the feeding of a gas to a fuel cell (3); the throttle valve (10) comprises:
a valve body (12) including a first (12A) and a second portion (12B);
a gas feeding duct (14) obtained in the first portion (12A) of the valve body (12);
a throttle plate (15), arranged in the feeding duct (14);
a shaft (16), which is rotatably mounted in the first portion (12A) of the valve body (12) and supports the throttle plate (15); and
an actuator (8), which is mounted in the second portion (12B) of the valve body (12) and is configured to rotate the shaft (16);
the throttle valve (10) is characterized in that it comprises:
a magnetic joint (20), which transmits the motion from the actuator (8) to the shaft and comprises a first half (25) coupled to the shaft (16) and a second half (26) facing the first half (25) and coupled to the actuator (8); and
an insulating wall (27) which is configured to insulate the first portion (12A) of the valve body (12), in a pneumatically sealed manner, from the second portion (12B) of the valve body (12) and is arranged between the two halves (25, 26) of the magnetic joint (20).

2. The throttle valve (10) according to claim 1, wherein:
the first half (25) of the magnetic joint (20) comprises a plurality of first magnetic elements (41); and
the second half (26) of the magnetic joint comprises a plurality of second magnetic elements (29).

3. The throttle valve (10) according to claim 1 and comprising a position sensor (40), which is arranged in the first portion (12A) of the valve body (12), is coupled to the shaft (16) and is designed to detect the angular position of the shaft (12).

4. The throttle valve (10) according to claim 1 and comprising a return spring (34), which is arranged in the first portion (12A) of the valve body (12), is coupled to the shaft (16) and is designed to rotate the shaft (16) towards a closing position.

5. The throttle valve (10) according to claim 1 and comprising a gear transmission (18), which is arranged in the second portion (12B) of the valve body and is configured to connect the first half (25) of the magnetic joint (20) to the actuator (8).

6. The throttle valve (10) according to claim 5, wherein the gear transmission (18) comprises:
a first gear (21), which is integral to a shaft of the actuator (8);
a second gear (22), which meshes with the first gear (21); and
a toothed sector (23), which meshes with the second gear (22) and is arranged, relative to the second gear (22), on the side opposite the first gear (21).

7. The throttle valve (10) according to claim 6, wherein the second gear (22) comprises a first larger toothed ring, which meshes with the first gear (21), and a second smaller toothed ring, which meshes with the toothed sector (23).

8. The throttle valve (10) according to claim 6, wherein the toothed sector (23) is coaxial and directly fitted to the first half (25) of the magnetic joint.

9. An electric drive vehicle (1) comprising:
a reservoir (2) containing hydrogen;
a fuel cell (3), which uses hydrogen to generate electric energy;
a duct (4, 5), which connects the reservoir (2) to the fuel cell (3); and
at least one electric motor (6) connected to drive wheels;
the electric drive vehicle (1) is characterized in that it comprises a throttle valve (10) according to claim 1.

\* \* \* \* \*